United States Patent [19]

Stauffer et al.

[11] Patent Number: 5,111,684
[45] Date of Patent: May 12, 1992

[54] METHOD AND APPARATUS FOR LEAK TESTING PACKAGES

[75] Inventors: Anton Stauffer, Bedford, N.Y.; Heinz Wolf, Budd Lake, N.J.

[73] Assignee: Pack Systems, Tuchahoe, N.Y.

[21] Appl. No.: 616,840

[22] Filed: Nov. 21, 1990

[51] Int. Cl.⁵ ............................................. G01M 3/36
[52] U.S. Cl. ........................................ 73/49.3; 73/52
[58] Field of Search ................. 73/49.3, 52, 45.3, 45.4

[56] References Cited

U.S. PATENT DOCUMENTS

| | | | |
|---|---|---|---|
| 2,093,429 | 9/1937 | Foss | 73/52 |
| 3,371,781 | 3/1968 | Armbruster et al. | 73/52 |
| 3,998,091 | 12/1976 | Paquette et al. | 73/52 |
| 4,747,299 | 5/1988 | Fox et al. | 73/49.3 |
| 4,774,830 | 10/1988 | Hulsman | 73/49.3 |
| 4,899,574 | 2/1990 | Potteiger | 73/49.3 X |
| 4,901,558 | 2/1990 | Leining et al. | 73/49.3 |
| 4,922,746 | 5/1990 | Hulsman et al. | 73/49.3 |
| 4,930,345 | 6/1990 | Bausch | 73/45.4 |
| 4,934,180 | 6/1990 | Hulsman | 73/49.3 |

Primary Examiner—Hezron E. Williams
Assistant Examiner—Joseph W. Roskos
Attorney, Agent, or Firm—Antonelli, Terry, Stout & Kraus

[57] ABSTRACT

A method and apparatus for leak testing a sealed package having at least one flexible wall portion and a sealed flange wherein at least one flexible wall portion of the package spaced from at least a seal-exposing edge of the sealed flange is gripped and pulled outwardly from the package to stress the package in tension while at least the seal-exposing edge of the sealed flange is exposed to a gas pressure equal to or greater than atmospheric pressure. The reaction of the sealed package to the stressing is then detected. The method and apparatus are useful for testing retort or aseptic pouches, cups and multi-layered trays with heat sealed lids, etc., with or without head space. Leaks in the seal and also in areas adjacent the seal can advantageously be detected quickly and with a high degree of reliability.

15 Claims, 7 Drawing Sheets

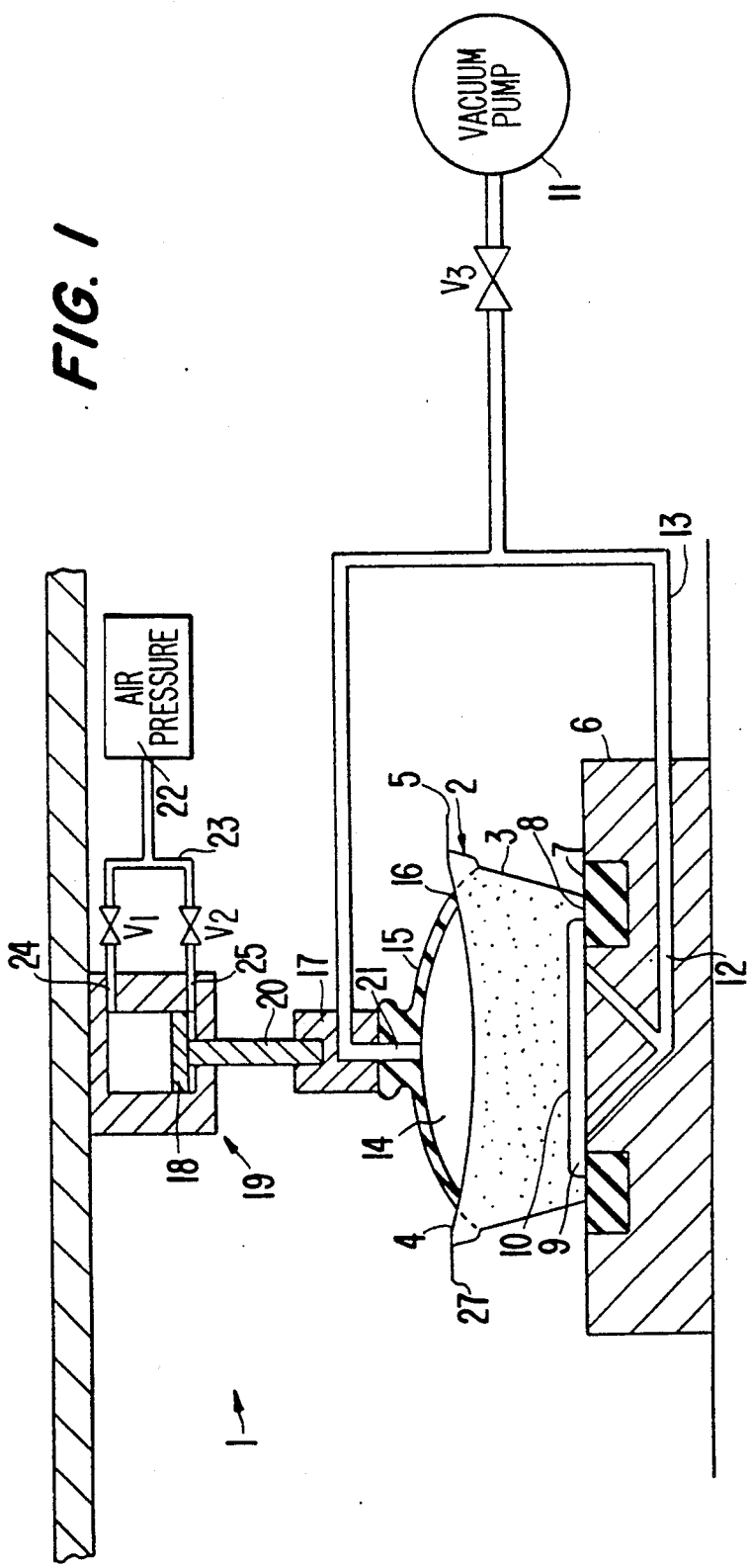
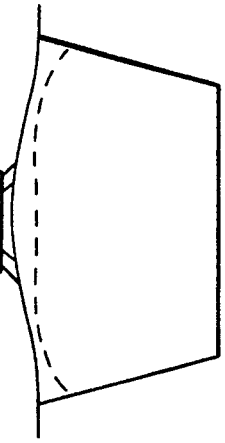
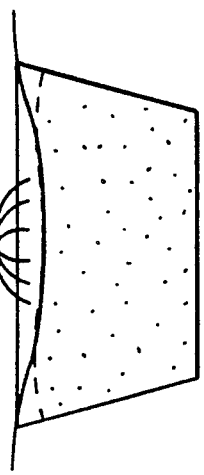
FIG. 1
FIG. 2A
FIG. 2B

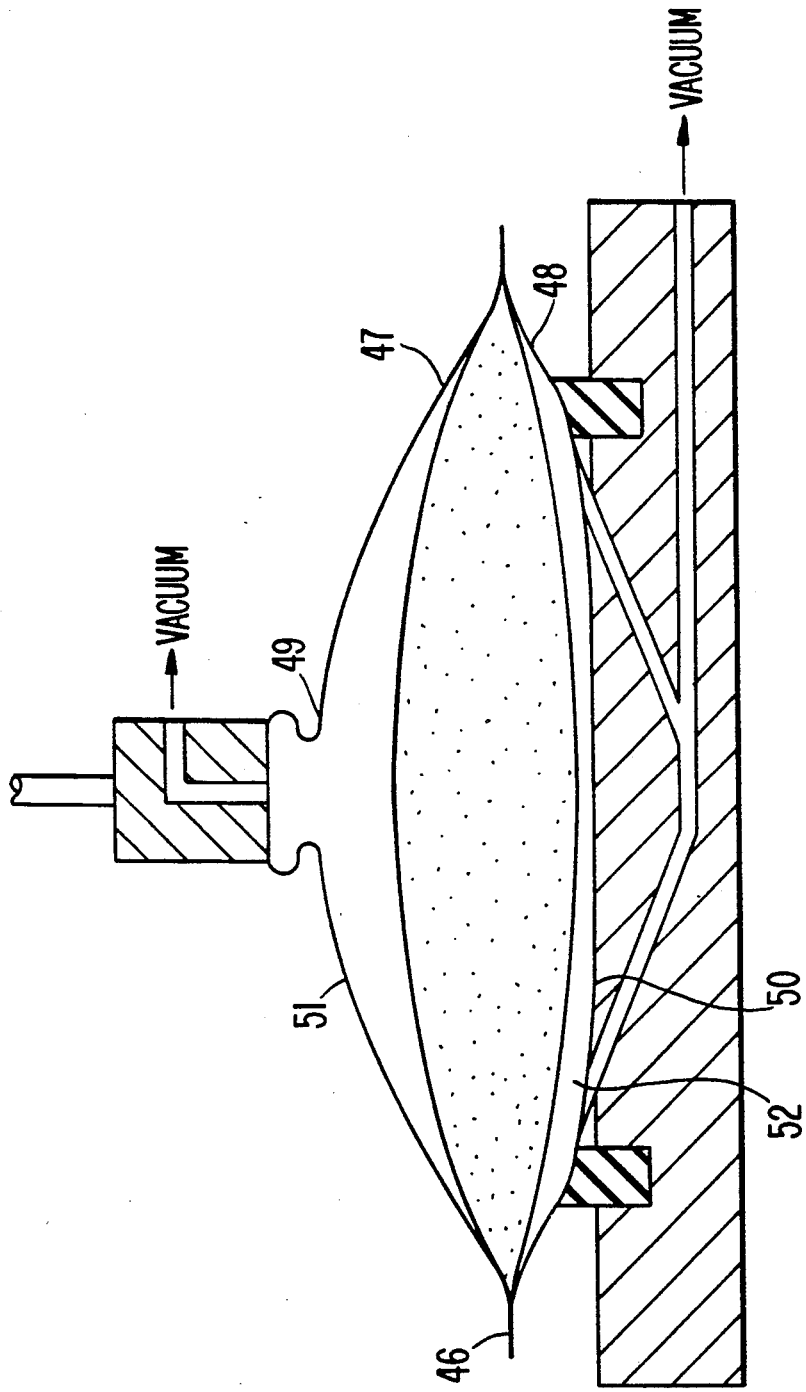

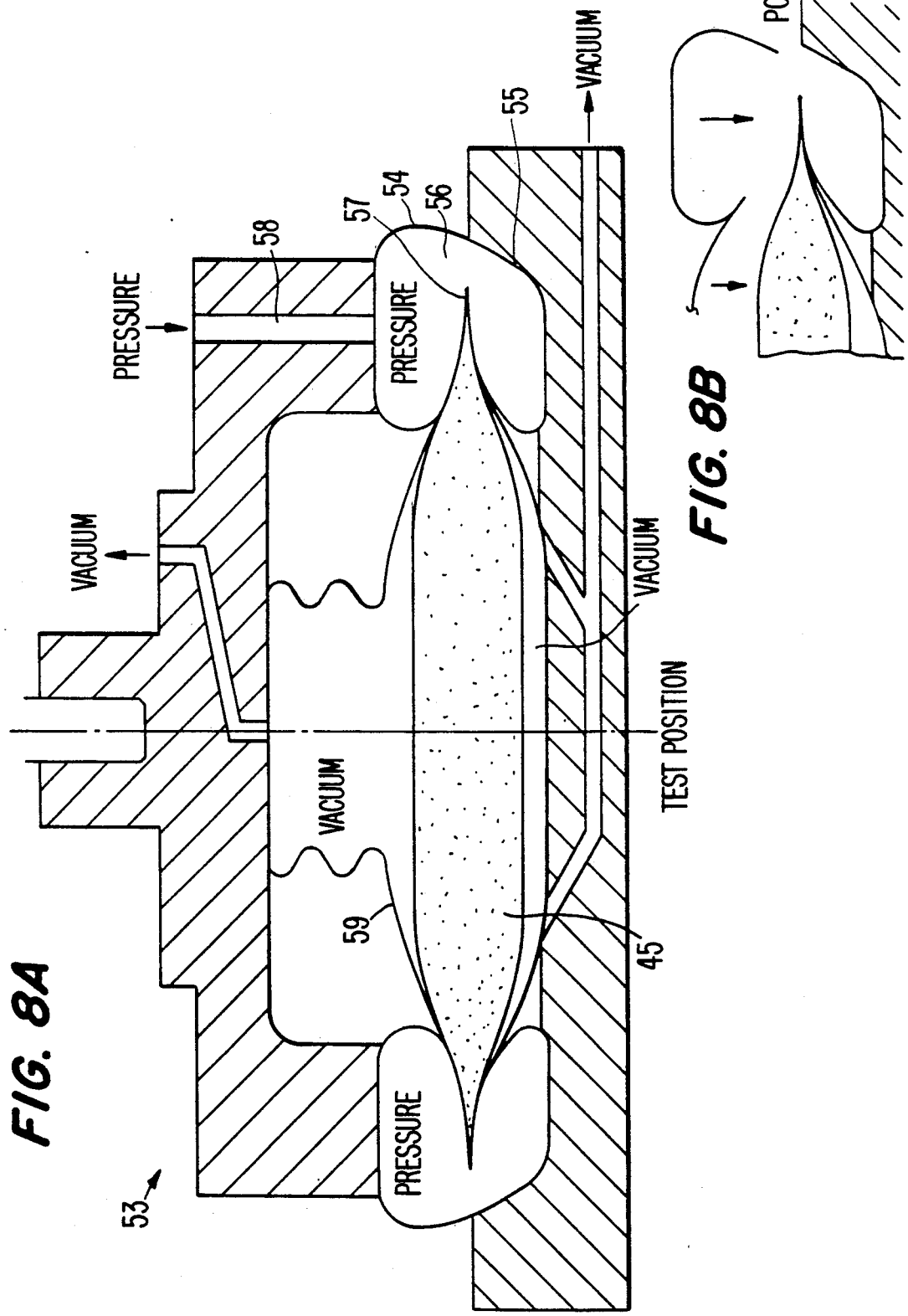

METHOD AND APPARATUS FOR LEAK TESTING PACKAGES

TECHNICAL FIELD

The present invention is directed to an improved method and apparatus for leak testing a sealed package, particularly one having at least one flexible wall portion and a sealed flange between adjacent wall portions of the package.

BACKGROUND ART

Leak testing of sealed packages is desirable to insure the integrity of the seal. Where the package is a sealed can having a metal end, it is known from U.S. Pat. No. 2,093,429 to confine the metal end by holding it in a testing head and removing atmospheric pressure from the outside face of the end. The end may flex outwardly at such time which is indicative of a leak or where the vacuum still obtains in the sealed can there will be no movement of the end. However, this known method and the testing machine for practicing it are not applicable to packages having other flexible wall portions since the removal of atmospheric pressure from outside the face of one end of the package would collapse the package.

U.S. Pat. No. 3,371,781 discloses an apparatus for inspecting sealed containers at high production rates to determine whether or not an adequate vacuum exists within the container. A proximity sensor is mounted to be accurately positioned with respect to a flip panel in the container cap, regardless of variations in container height or cocking or tilting of the cap on the container. This conventional method and apparatus are useful for inspecting sealed containers such as glass jars with metal caps for baby food where the caps for the jars have a flip panel. However, this passive method and the related apparatus are not useful for leak testing sealed packages such as flexible or semi-flexible packages which do not include a flip panel.

One recent attempt to overcome the aforementioned limitations of known leak testing methods and apparatus in testing flexible packages is disclosed in U.S. Pat. No. 4,774,830. The patent discloses a leak detector for detecting leaks in flange-shaped seals between lid and body portions of a package wherein a pressure chamber is provided which isolates the external edge of the seal and applies test pressure thereto. Containment of the pressure chamber includes sealing pressure applied mechanically to the flange-shaped package seal during testing, but this sealing pressure does not affect seal testing because it is appropriately limited by a self-compensating biasing of the mechanical seal. One disadvantage of this known method and apparatus is that it is limited to detecting defects in the seal itself. Defects adjacent the seal, such as stress cracks in the package near the seal, are not detected in this known method and apparatus.

It is also known to test sealed flexible containers by placing them in an evacuated chamber and detecting the degree to which the walls of the container bulge in this condition since the pressure is greater inside the container than outside the container within the chamber. This "bulging wall test" is problematical however, especially in the case of containers which are filled with no head space, since the contents of the container can plug a leak and make it difficult to reliably detect a defective container. A recent effort to solve these problems is disclosed in U.S. Pat. No. 4,901,558 wherein a microprocessor is used to simultaneously examine the measured deflection of the walls or sides of sealed packages placed in a vacuum chamber and evaluate the status of the vacuum within the vacuum chamber.

It is also known to apply a compressive force to a package and observe the reaction of the package for purposes of detecting a leak. For example, in U.S. Pat. No. 4,930,345, the apparatus inwardly elastically deflects the walls of a sealed cup and monitors the bulged position of a flexible cover on the cup U.S. Pat. No. 4,747,299 discloses a method of testing a package seal wherein the pressure on the outside of a cup of the package is reduced to bow the flexible lid inwardly. A change in the position of the distended wall of the cup is sensed for determining the integrity of a package seal. U.S. Pat. No. 4,899,574 is directed to a method and apparatus for detecting leaks in a sealed container wherein a compressive force is applied to a flexible lid of the container so as to circumscribe an area of the lid which is coaxial with the center of the cup. The circumscribed area bulges outwardly and the position thereof is detected. During testing, the sealed container is gripped between upper and lower test assemblies which engage opposite sides of the seal at the container lip to form respective chambers about the opposite sides of the container. Pressure or vacuum conditions can be maintained within these chambers during testing. Each of these known methods and apparatus require the application of compressive force to the sealed package and at least the apparatus and method of U.S. Pat. No. 4,899,574 may not successfully detect defects located in wall portions clamped between the upper and lower test assemblies.

There is a need for an improved method and apparatus for leak testing sealed packages, particularly flexible packages, which do not suffer from the aforementioned limitations and drawbacks of the known leak testing methods and apparatus.

DISCLOSURE OF INVENTION

An object of the present invention is to provide an improved method and apparatus for leak testing a sealed package having at least one flexible wall portion and a seal between adjacent wall portions of the package which overcome the aforementioned problems and disadvantages of the known methods and apparatus. More particularly, an object of the invention is to provide an improved method and apparatus for leak testing which are fast, relatively inexpensive and which can be used in the production line to reliably test for small leaks, for example, to avoid spoilage in food products such as meats.

A further object of the invention is to provide an improved method and apparatus for leak testing a sealed package which do not require that the package include a metallic flip panel and which enable detection of leaks in a seal of the package and also in areas adjacent the seal.

An additional object of the invention is to provide an improved method and apparatus for leak testing a sealed package or container which do not require the placement of the entire package in a vacuum chamber. A still further object is to provide such a method and apparatus which permit leak testing of a sealed container filled with no head space without concern that any leaks may be plugged by the contents of the container during the test.

Another object of the invention is to provide an improved method and apparatus for leak testing a wide variety of sealed packages, particularly those having at least one wall portion which is flexible, including retort or aseptic pouches, and cups and multilayered trays with lids sealed thereto, with or without head space, and without the application of a compressive force to the package in a manner which could prevent detection of leaks in the area of the sealed flange or immediately adjacent thereto.

These and other objects are attained by the improved method and apparatus of the invention for leak testing a sealed package having at least one flexible wall portion and a sealed flange between adjacent wall portions of the package. The method comprises providing the sealed package, applying a tensile force to at least one flexible wall portion of the package spaced from at least a seal-exposing end of the sealed flange to stress the package while at least the seal-exposed end of the sealed flange is exposed to a gas pressure equal to or greater than atmospheric pressure, and detecting the reaction of the sealed package to the stressing. This open seal area can be flushed with sterile gas to prevent any potential contamination of the food inside the container. According to the disclosed, preferred embodiments of the invention, the step of applying a tensile force includes pulling a flexible wall portion of the sealed package outwardly in a direction away from the package to stress the package. Other flexible wall portions of the package are stabilized during this pulling to prevent collapse of the container.

Applying a force to at least one flexible wall portion of the package spaced from at least a seal-exposing edge of the sealed flange to stress the package preferably involves establishing a pressure which is less than atmospheric on the outside of the at least one flexible wall portion of the package with a vacuum enclosure and pulling upwardly on the enclosure. For this purpose, a space on the outside of the at least one flexible wall portion is enclosed by the vacuum enclosure and the pressure in the space is reduced to less than atmospheric by communicating the space with a vacuum pump.

The flexible sealed package can have opposed flexible wall portions, for example. In order to accurately detect the reaction of the sealed package to the tensile stressing in such case and to prevent collapse of the package, the method comprises placing first and second vacuum enclosure means over respective ones of the opposed flexible wall portions of the package for enclosing a space on the outside surface of each of the respective wall portions and communicating the enclosed spaces with the vacuum pump to lower the pressure on the outside of the flexible wall portions within the respective vacuum enclosure means. The vacuum on the opposing outer surfaces of the package counter one another and stabilize the sealed package to prevent it from collapsing thereby enabling an accurate, reliable detection of leaks.

The step of applying force in the method of the invention further comprises pulling at least one of the vacuum enclosure means in a direction away from the other to stress the package which is gripped by the opposed vacuum enclosure means as a result of the vacuum in the enclosed spaces. This lifting motion can pull a weak seal open or if a small pinhole leak is present, air or sterile gas will move into the package and bulge a flexible wall portion of the package. The level of stress which is exerted on the sealed packages is selected to be non-destructive to a properly sealed package but of such magnitude that the pulling will break a defective seal and/or pull air into the stressed package through a leak if a leak is present.

The step of providing the sealed package according to the preferred embodiments of the invention includes forming the sealed flange by bonding overlapping edge portions of adjacent wall portions of the package to one another, for example, by heat sealing. In one form of the invention the sealed package includes a flexible lid sealed to a flange at an upper edge of a cup of the package with both the lid and at least the bottom wall of the cup being flexible wall portions of the package.

The step of detecting the reaction of the sealed package to the stressing can be accomplished by sensing the position of a flexible wall portion of the package, either after or during the stressing of the package by the application of the force to the package. The reaction of the sealed package to the stressing can also be detected by detecting the pressure in the enclosed space outside of the at least one flexible wall portion of the package during the test. For a more sensitive indication, detection can be accomplished by detecting the change in the pressure in the enclosed space over time.

An additional step which can be performed in the method for leak testing involves the application of a gas pressure greater than atmospheric to the seal-exposing edge of the sealed flange of the package during the stressing. The gas pressure augments the induced pressure differential created by stressing the package through the application of a force to a flexible wall of the package thereby facilitating ingress of gas into the package through any small leaks in the seal. The pressurized gas applied to the seal-exposing edge can be a sterile gas.

A further feature of the disclosed, preferred form of the invention is that the force can be applied to at least one flexible wall portion of the package in an area spaced from not only the seal-exposing edge of the sealed flange but also the seal itself so that leaks in the package material adjacent the seal, such as stress cracks, can be effectively detected.

The improved apparatus of the invention for leak-testing a sealed package having at least one flexible wall portion in a sealed flange between adjacent wall portions of the package comprises means for applying a force to at least one flexible wall portion of the package spaced from at least a seal-exposing edge of the sealed flange to stress the package while at least the seal-exposing edge of the sealed flange is exposed to a gas pressure which is equal to or greater than atmospheric pressure, and means for detecting the reaction of the sealed package to the stressing. The means for applying a force preferably pulls a flexible wall portion of the sealed package outwardly in a direction away from the package to stress the package so that a gas will be sucked in through any leaks in or adjacent to the seal. Preferably, the flexible wall portion is pulled by pulling a vacuum enclosure means outwardly as with a piston-cylinder unit after a pressure which is less than atmospheric has been established on the at least one flexible wall portion of the package and within the vacuum enclosure means. In the case of a sealed package having opposed flexible wall portions, both wall portions are held in respective ones of first and second vacuum enclosure means during this pulling in order to stabilize the flexible package during stressing. At least one of the first and second vacuum enclosure means is preferably a suction cup.

The means for detecting the reaction of the sealed package to the stressing includes at least one of a device for detecting the position of the at least one flexible wall portion, means for detecting the pressure in the enclosed space outside of the at least one flexible wall portion and means for detecting a change in pressure over time in the enclosed space.

These and other objects, features and advantages of the present invention will become more apparent from the following description when taken in connection with the accompanying drawings which show, for purposes of illustration only, several preferred embodiments in accordance with the present invention.

BRIEF DESCRIPTION OF THE DRAWINGS

FIG. 1 is a schematic illustration, partially in cross-section, of a first embodiment of an apparatus of the invention for leak testing a sealed package having at least one flexible wall portion and a sealed flange between adjacent wall portions of the package;

FIG. 2a is a cross-sectional view of a sealed package, particularly a cup with a flexible lid sealed thereto and a detector for detecting the position of the lid after testing in the apparatus of FIG. 1 where the cup is one with a good seal; and FIG. 2B is a view similar to FIG. 2A except that the sealed package which has been tested in the apparatus of FIG. 1 has a bad seal, that is, has a leak therein;

FIG. 7 is a schematic illustration, partially in cross-section, of a portion of a still further embodiment of an apparatus of the invention for leak testing a sealed pouch formed of flexible material;

FIG. 8A is a schematic, cross-sectional view of an additional embodiment of the apparatus of the invention for leak testing a sealed package, for example for cups and trays with heat sealed lids or pouches, wherein an enclosure is provided about the seal-exposed edge of the sealed flange of the package with a pressurized gas (sterile or standard) being introduced into/this area during testing; and FIG. 8B is a illustration of a portion of the apparatus of FIG. 8A wherein the apparatus, instead of being in the test position as shown in FIG. 8A, is in the open position for introducing and removing the sealed package from the apparatus.

BEST MODE FOR CARRYING OUT THE INVENTION

Figure 3:
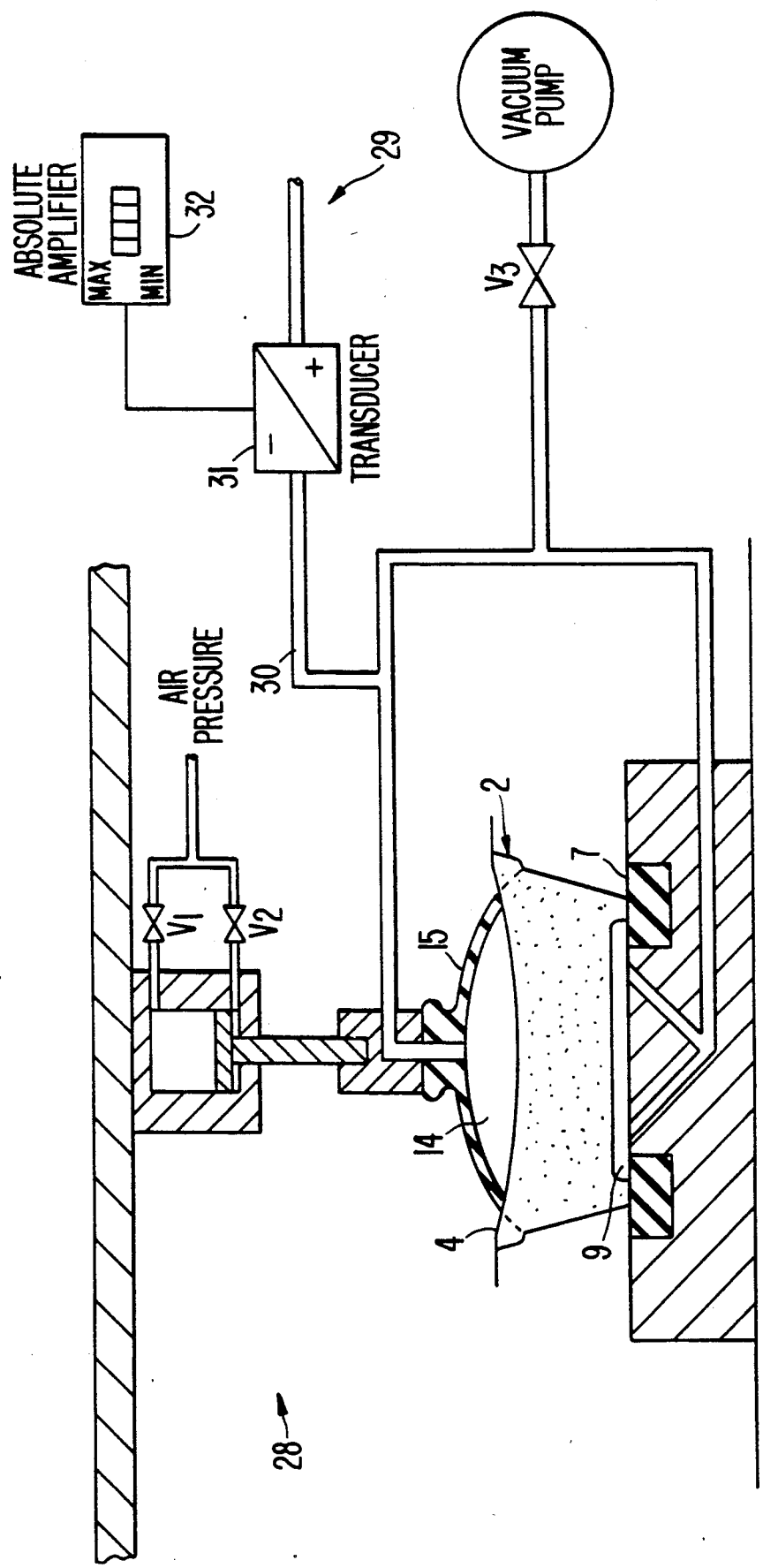
FIG. 3 is a schematic illustration, partially in cross-section, of a second embodiment of the apparatus of the invention, similar to that in FIG. 1, except that it includes a pressure transducer and absolute amplifier for detecting the pressure within the suction cup above the lid on the cup for detecting the reaction of the sealed package during testing.

An apparatus 1 of the invention as illustrated in FIG. 1 is for leak-testing a sealed package having at least one flexible wall portion and a sealed flange between adjacent wall portions of the package. The sealed package 2 in FIG. 1 comprises a cup 3 having a lid 4 which overlaps the upper surface of and is bonded to a flange 5 of the cup about the upper open end of the cup as by heat sealing, for example. The cup 3 is formed of molded plastic in the disclosed embodiment but could be formed of steel, aluminum or other material or a composite of several materials. The lid 4 of the upper surface of the package 2 is formed of a plasticized aluminum foil in the illustrated embodiment but other materials including metal, paper and plastic and combinations thereof could be employed to form the lid as well as the cup. The package 2 is filled with a food product such as applesauce in the disclosed embodiment but it could contain other substances such as pharmaceuticals, plasma, etc. There is no head space or ullage in package 2 but this is not limiting. The pressure within the package is atmospheric pressure or slightly less than atmospheric. Both the lid 4 and the bottom of the cup 3 of the package 2 are flexible wall portions of the package whose shape can change with a change in pressure between the inside and outside of the sealed package. At least the lid 4 is flexible in the sense that its shape will change with a change in the volume within the package.

The apparatus 1 comprises a base 6 with an annular seal 7 having an upper surface thereof for sealing against a circumferentially extending, depending flange 8 on the bottom of the cup 3. The space 9 enclosed by the recessed, flexible bottom wall 10 of the cup 3, flange 8 and the base 6 inwardly of seal 7 is communicated with a vacuum pump 11 by passage 12 in the base 6 and vacuum line 13 extending between the passage and the vacuum pump. A valve $V_3$ opens and closes the vacuum line 13.

A space 14 above the flexible lid 4 of the sealed package 2 is enclosed by a second vacuum enclosure 15 in the form of a rubber suction cup. The lower, outer circumferential edge 16 of the suction cup forms a seal with the lid 14 about the space 14. The upper end of the suction cup is secured to and movably supported on metal fitting 17 which, in turn, is drivingly connected to a piston 18 of a piston-cylinder unit 19 by connecting rod 20. A passage 21 through the fitting 17 and the upper end of the suction cup communicates the space 14 with the vacuum pump 11 by way of a portion of vacuum line 13 which is connected to the fitting 17. Air pressure from a source of pressurized air 22 is selectively directed to the chambers above and below the piston 18 in the piston-cylinder unit 19 by way of line 23 and passages 24 and 25 in the cylinder of unit 19. Valves $V_1$ and $V_2$ open and close the line 23 to the respective chambers.

To test the sealed package 2 for leaks and seal integrity, the filled and sealed package 2 is transferred to the precise position in the apparatus 1 illustrated in FIG. 1 while the suction cup 15 is elevated to its upper position by opening valve $V_2$ and closing valve $V_1$ to vent the air pressure in the supper chamber to exhaust and block communication of the upper chamber and source 22 through line 23. The filled and sealed package 2 can be manually positioned on the base 6 and the apparatus 1 manually operated or fully automated processing of the filled and sealed packages can be employed. For example, an automated system could employ either linear single or multi-station testing apparatus of the type illustrated in FIG. 1 with indexing or continuously-working conveyors or a rotary-type testing arrangement, depending upon output requirements, Illustratively, automatic positioning of the sealed package 2 from the base 6 could be performed via in-feed screw and rotary star as will be readily apparent to the skilled artisan.

Once the package 2 is positioned on the annular seal 7 of base 6 at the test station of the apparatus 1, a portion of the lid 4 and bottom wall 10 are enclosed by operating valve $V_1$ to communicate the pressure chamber in the piston-cylinder unit 19 above the piston 18 with the source of air pressure 22 while the pressurized gas in the chamber beneath the piston 18 is exhausted by closure of the valve $V_2$. The downward stroke of the piston 18 moves the sealing surface 16 of the suction cup 15 into contact with the lid and presses and package 2 slightly downwardly on the seal 7 on the base 6. The valve $V_3$ then opens and pulls a measured vacuum on both sides of the package 2 from vacuum pump 11 within the enclosed spaces 9 and 14 which are communicated with one another and the vacuum pump by line 13. As an example, the measured vacuum established in the enclosed spaces 9 and 14 can be 800 mb.

After a predetermined period of time, which can be as short as a fraction of a second to several seconds or more, $V_1$ is closed to vent the chamber above the piston 18 and simultaneously $V_2$ is opened such that the unit 19 pulls upwardly with an adjustable force on the suction cup 15 in a direction away from the package 2. As this occurs the package is retained on the base 6 because of the vacuum pressure in the enclosed space 9. The adjustable upward force on the package from the piston-cylinder unit 19 is selected so as to exert a certain non-destructive physical stress on the package in the case the package has no leaks and a good seal at the flange 4. For example, a force of several pounds could be used depending on the package. However, in the case the package has a weak seal, the force is sufficient to cause it to come apart or blow the seal. Where the package has a leak in or adjacent the sealed flange 5, the upward force stressing the package in tension will cause air or gas to be sucked into the package through the leak, which is exposed to the atmosphere, which will bulge or lift the flexible lid 4 of the package. After lapse of a predetermined pulling time, the valve $V_3$ is closed and the spaces 9 and 14 vented to atmosphere to release the vacuum in the spaces.

The tested package 2 is then removed from the apparatus 1 and is passed under a sensor 26 to verify the lid position. If the lid is in an up position as shown in FIG. 2B, the package will be rejected because leakage of air into the package has permitted the lid to be moved upwardly during the test. A properly sealed package after testing is illustrated in FIG. 2A wherein it is seen that the lid 4 has not been lifted upwardly as a result of the test. Alternatively, position sensors could be included in the apparatus 1 to determine the position of the lid as an indication of a leak during the time that the predetermined vacuum pressure is maintained in the enclosed spaces 9 and 14. Since air or gas is sucked into the package 2 where there is a leak in or adjacent to the annular seal at flange 5, the package 2 can be one which is filled with no head space without fear of plugging the leak or leaks with the contents of the package during testing.

Most leaks occur in the annular seal between the overlapping lid 4 and flange 5 of the plastic cup in a sealed package of the type shown at 2 in FIG. 1. However, some leaks occur just inside the annular seal. If the vacuum pulled by the suction cup 15 extends to the area immediately above the annular seal, even though the seal-exposed edge 27 of the sealed flange is exposed to the atmosphere, leaks inside the sealed flange will be covered by the suction cup and will not be detected. Accordingly, preferably the lower, outer circumferential sealing edge 16 of the suction cup 15 seals against the lid 4 at a location spaced inwardly from the annular seal at the flange 5 of the cup 3 in order that leaks just inside the annular seal will be detected during leak testing. However, where the suction cup overlays the annular seal on the upper surface of lid 4, leaks in the seal itself will be detected so long as the seal-exposed edge, the radially outer edge of the overlapped lip 4 and flange 5 as shown in FIG. 1, of the sealed flange is exposed to the atmosphere. The apparatus 1 of FIG. 1 is also useful for leak testing sealed packages where only one part of the package, e.g. the lid, is flexible.

Figure 5:
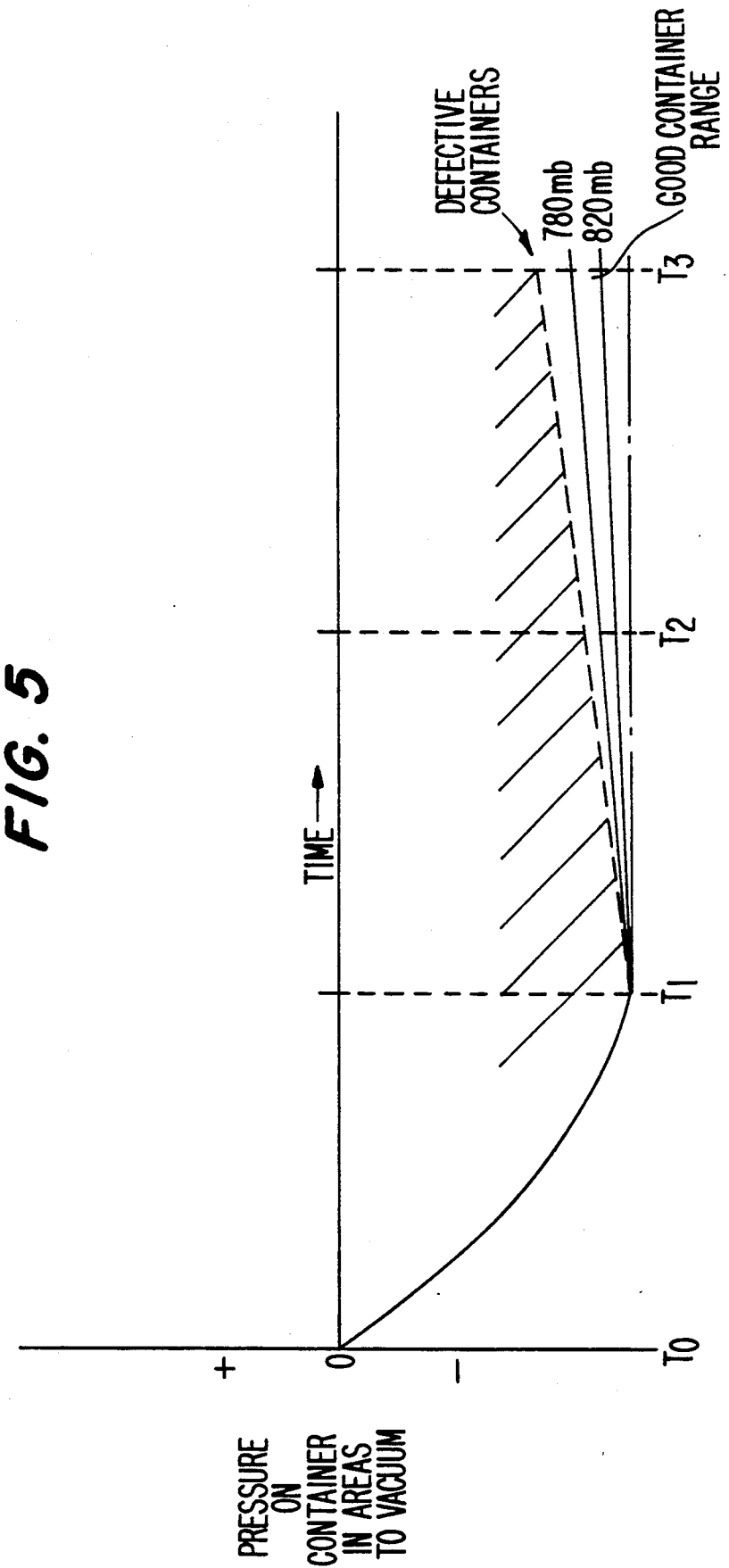
FIG. 5 is a graph of detected pressure versus time illustrating the detected pressure in the enclosed spaces adjacent the opposed flexible wall portions of the sealed package during testing with the apparatus of FIGS. 3 and 4.

The apparatus 28 of the embodiment illustrated in FIG. 3 of the drawings is like the apparatus 1 in FIG. 1 except that it includes, as means for detecting the reaction of the sealed package 2 to the stressing, means 29 for detecting the pressure in the enclosed space 14 above the lid 4 during the test. The means 29 comprises a vacuum line 30 connected to the vacuum line 13, a pressure transducer 31 and an absolute pressure indicating amplifier 32. A method for leak testing a sealed package with the apparatus 28 is described with reference to FIGS. 3 and 5.

In the method the sealed package 2 is positioned on the base 6 of the apparatus 28 in the manner described above with reference to FIG. 1. The piston-cylinder unit 19 is operated to lower the suction cup 15 and a measured vacuum is established in the enclosed spaces 9 and 14 by vacuum pump 11 at time $T_0$ illustrated in FIG. 5. The piston-cylinder unit 19 is again operated to pull upwardly on the suction cup 15 to stress the package in tension on or before the time $T_1$ without breaking the vacuum sealer with the package by the suction cup 15 and base 6. After a period of stabilization, at the time $T_3$, the absolute pressure in the enclosed spaces 9 and 14 is measured by means of the pressure transducer 31 and amplifier 32. If the measured vacuum decreases (pressure increases) more than a normal amount, due to the upward movement of the lid 4 an abnormal amount as a result of inflow of air into the package, then the package is determined to be a leaker and is rejected. In the example illustrated in FIG. 5, at the time T3 a measured absolute pressure between 780 and 820 mb is within the good container range. However, if the pressure is less than 780 mb, the package is deemed defective and rejected.

Figure 4:
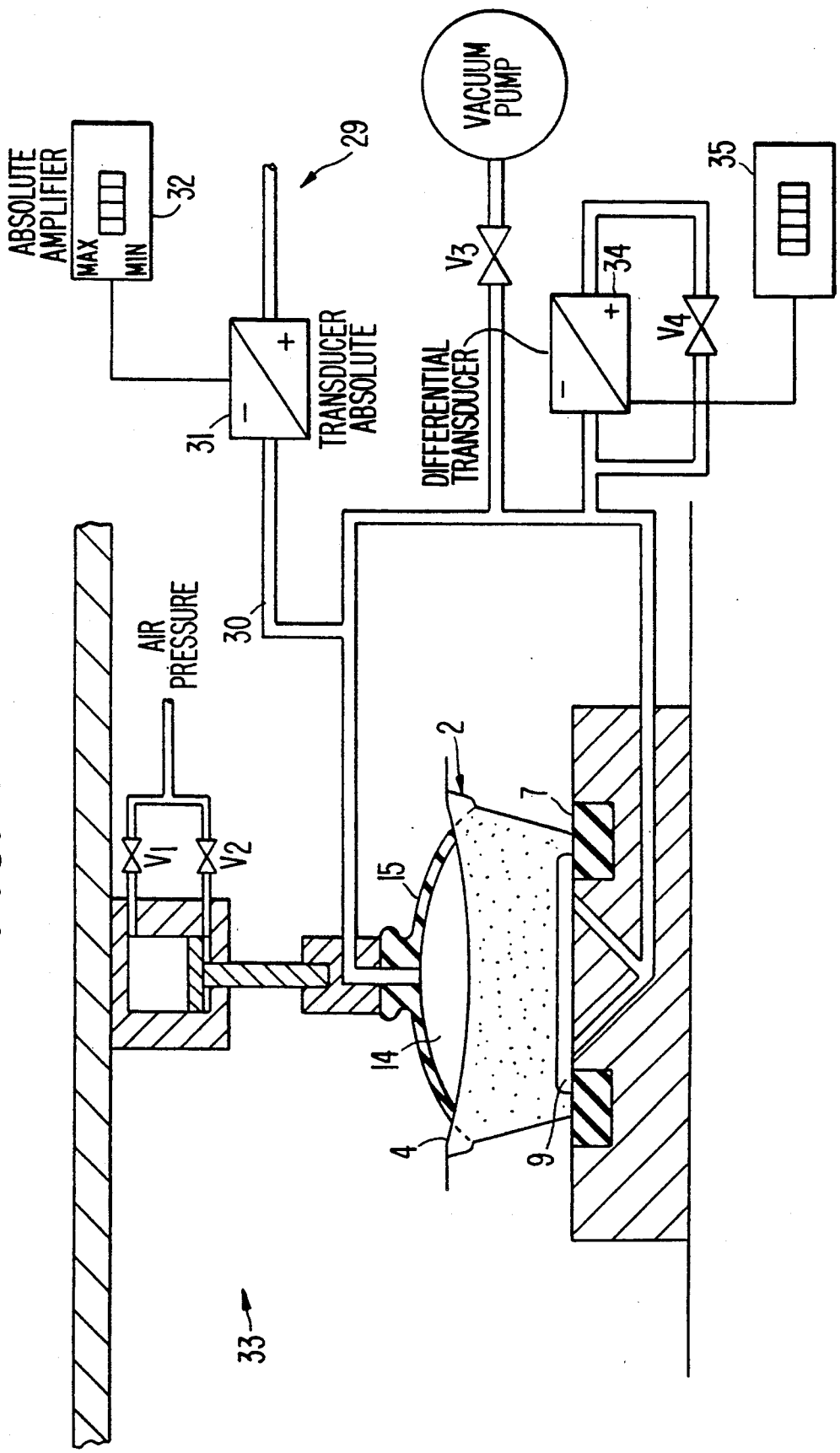
FIG. 4 is a schematic illustration, partially in cross-section of a third embodiment of an apparatus of the invention for leak testing a sealed package wherein the apparatus further includes a differential pressure transducer and amplifier for detecting the change in pressure over time in the low pressure enclosed spaces adjacent the flexible wall portions of the containers formed by the suction cup and the base adjacent the package.

The test results can also be measured dynamically by detecting the change in pressure in the enclosed spaces over time. The apparatus 33 in FIG. 4, for this purpose, includes a differential transducer 34 whose output is received by amplifier 35. For operation of the apparatus 33 to perform the leak test on a sealed package 2, as described with reference to FIG. 5 and the operation of apparatus 28, at time $T_2$, a valve $V_4$ is closed to begin the cycle between $T_2$ and $T_3$ for measuring a change in pressure in the enclosed spaces 9 and 14. If the change in pressure in the enclosed spaces as measured by amplifier 35 from time $T_2$ to time $T_3$ exceeds a predetermined amount, for example 10 mb, the package is deemed to have a leak and is rejected. This method is more sensitive than that described for operation of the apparatus of FIG. 3. In another form of the invention, the differential transducer and amplifier test apparatus of the apparatus 33 could be moved up to the piston-cylinder unit and communicated with the fluid pressure above the piston since with a leaker, the piston will gradually move upward with the upward movement of flexible lid 4 during stressing thereby reducing the space within the chamber above the piston to change the pressure therein where the valve $V_1$ is closed over the time period in question.

Figure 6:
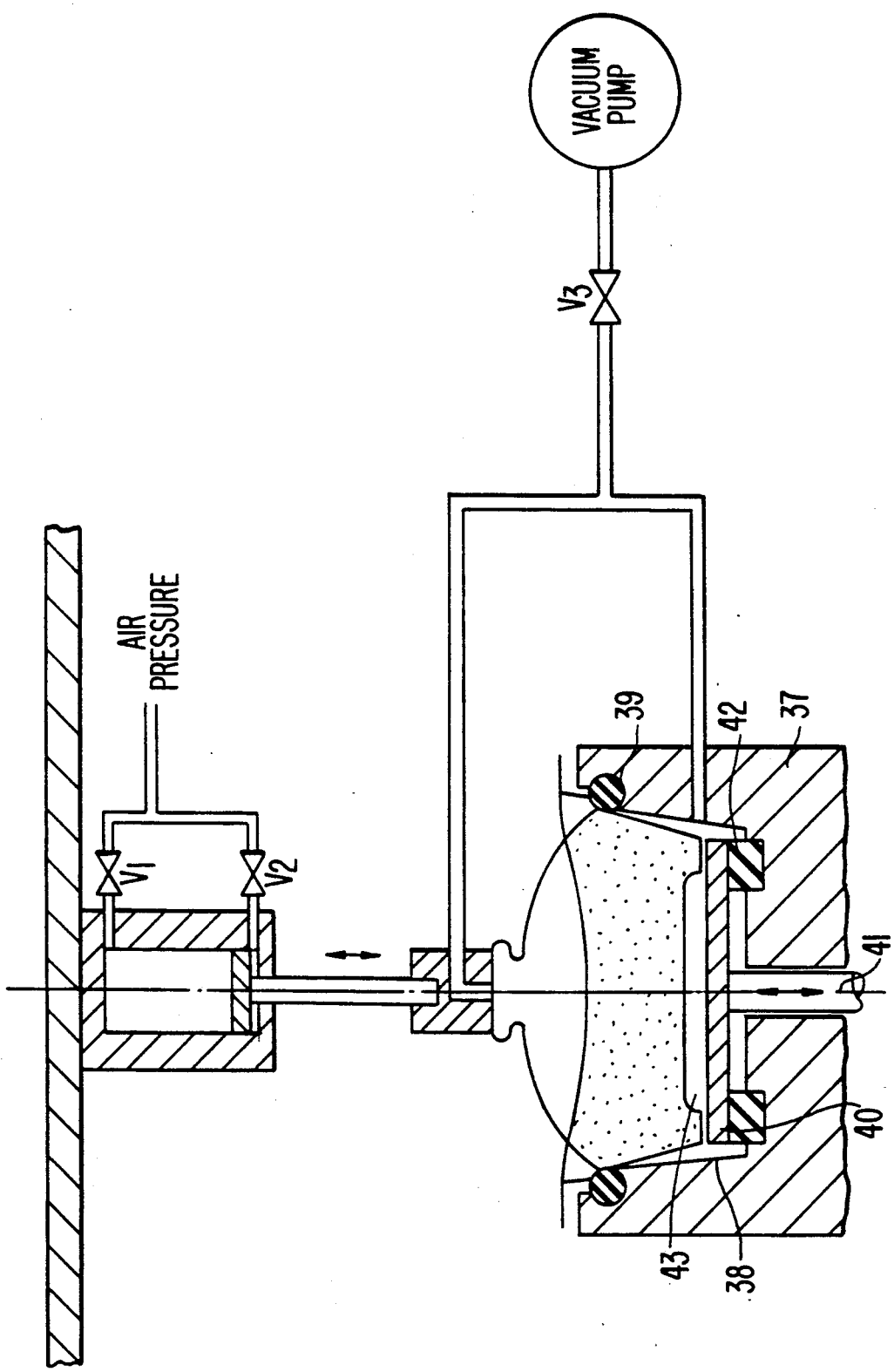
FIG. 6 is a schematic illustration, partially in cross-section, of a further embodiment of the apparatus of the invention wherein the vacuum enclosure for the cup of the sealed package encloses not only the bottom of the cup but also sidewalls thereof for stabilizing flexible walls of the cup.

The apparatus 36 illustrated in FIG. 6 is similar to the apparatus 1 in FIG. 1 but the base 37 of the apparatus is formed with a recess 38 in its upper surface for receiving the lower end of the sealed package 2. An O-ring type seal 39 supported in the base 37 contacts the side wall of the cup of the package near an upper end thereof in order to stabilize not only the flexible bottom wall of the package but also the side walls thereof in the case of possible collapse of these walls during leak testing. Lift plate 40 is located in the bottom of the recess 38 for ejecting a tested package by upward movement of connecting rod 41 secured to the lower surface of plate 40. Seal 42 between plate 40 and the bottom of recess 38 enables a vacuum to be drawn in the space 43 about the side wall and bottom of the plastic cup 3 of the sealed package 2.

The apparatus 44 depicted in FIG. 7 is for leak testing a filled, sealed pouch 45 formed of flexible sheet material bonded at flange 46. Rubber seals 47 and 48 at the outer perimeter of vacuum enclosure means 49 and 50 seal against the opposite outer surfaces of the pouch 45 inwardly of the flange 46 to form enclosed spaces 51 and 52 in which a vacuum can be drawn as described above in connection with the other embodiments. Detection of the reaction of the sealed package to the stressing when the upper suction cup 49 is pulled upwardly can be by one or more of the aforementioned techniques, namely with position sensors during or after leak testing, absolute pressure measurement and change in pressure over time in the enclosed spaces during the leak test.

The sealed package, cup, pouch, or other shaped package, is stressed in tension in the aforementioned embodiments through the use of a vacuum pressure selectively applied to at least one flexible wall portion, particularly opposed flexible wall portions, of the package, and the outward pulling of the vacuum enclosure means for sucking air or gas in through leaks in or adjacent the sealed flange of the package. According to another embodiment of the invention, respective portions of the sealed package can be enclosed simultaneously by a vacuum and pressure chambers that may contain sterile gas.

The apparatus 53 in FIGS. 8A and 8B accomplishes this through the use of cooperating, flexible enclosure members 54 and 55 which cooperate to form a pressure chamber 56 about the sealed flange 57 of the sealed package 45, a pouch, in the test position of the package and apparatus as shown in FIG. 8A. Air pressure above atmospheric pressure is communicated with the chamber 56 by passage 58. In the apparatus 53, the center of the package 45 is subjected to a vacuum on opposite, outer surfaces in the manner described above in connection with FIG. 7 and thereafter the upper vacuum enclosure 59 is pulled upwardly by the piston-cylinder unit to create a vacuum inside the package. Simultaneously, or with a definable delay, the seal area about the flange 57 is subjected to a pressure greater than atmospheric pressure to increase the pressure differential between the outside and the inside of the package 45. In case of a leak, air will move inside the package and will be detected by either differential or absolute transducers or proximity sensors as discussed above. The addition of the pressure chamber 56 has the dual purpose of helping to make a tighter seal for the vacuum suction cups and helping to increase the pressure differential. In the open position of apparatus 53 depicted in FIG. 8B, the upper half of the apparatus is shifted upwardly by the piston-cylinder unit to the position shown in the drawing to permit removal of the leak tested package.

While we have shown and described only several embodiments in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as are encompassed by the scope of the appended claims.

We claim:
1. A method for leak testing a sealed package having at least opposed flexible wall portions and a sealed flange between adjacent wall portions of the package comprising:
   providing said sealed package,
   applying a force to at least one flexible wall portion of the package spaced from at least a seal-exposing edge of the sealed flange to stress the package while at least the seal-exposing edge of the sealed flange is exposed to a gas pressure equal to a or greater than atmospheric pressure, and
   detecting the reaction of the sealed package to the stressing, wherein said step of applying a force includes establishing a pressure which is less than atmospheric on the outside of said opposed flexible wall portions of the package by placing first and second vacuum enclosure means over respective ones of the opposed flexible wall portions of the package for enclosing a space on the outside surface of each of the respective opposed flexible wall portions which are spaced from at least the seal-exposing edge of the sealed flange and communicating the enclosed spaces with a vacuum pump to lower the pressure on the outside of the opposed flexible wall portions within the respective vacuum enclosure means, wherein said step of applying force further comprises pulling at least one of the vacuum enclosure means in a direction away from the other to stress said sealed flange of the package, and wherein said step of detecting the reaction of the sealed package comprises detecting a local bulging of at least one of the opposed flexible wall portions of the package that is subjected to said lower pressure in said vacuum enclosure means during said step of applying said force.

2. The method according to claim 1, wherein said step of providing said sealed package includes forming the sealed flange by bonding overlapping edge portions of adjacent wall portions of the package to one another.

3. The method according to claim 1, wherein said step of providing said sealed package includes filling said package such that there is no head space remaining in the package.

4. The method according to claim 1, wherein said package includes a flexible lid which is sealed to a flange of a cup of the package at an upper edge of the cup in said step of providing said sealed package, and wherein said lid and at least a bottom of the cup are opposed flexible wall portions of the package.

5. The method according to claim 1, wherein said step of detecting a local bulging comprises sensing the position of a flexible wall portion of the package.

6. The method according to claim 1, wherein said step of detecting a local bulging comprises detecting the pressure in the enclosed space after a predetermined period of time.

7. The method according to claim 1, wherein said step of detecting a local bulging includes detecting a change in the pressure in the enclosed space over time.

8. The method according to claim 1, further comprising applying a gas pressure greater than atmospheric pressure to at least the seal-exposing edge of the sealed flange of the package during said step of applying a force.

9. The method according to claim 1, wherein the seal-exposing edge of the sealed flange is exposed to atmospheric pressure.

10. An apparatus for leak-testing a sealed package having at least opposed flexible wall portions and a sealed flange between adjacent wall portions of the package, comprising means for applying a force to at least one flexible wall portion of the package spaced from at least a seal-exposing edge of the sealed flange to stress the sealed flange of the package in tension while at least the seal-exposing edge of the sealed flange is exposed to a gas pressure which is equal to or greater than atmospheric pressure, and means for detecting the reaction of the sealed package to the stressing, wherein said means for applying a force comprises first and second vacuum enclosure means for enclosing a space on the outside surface of each of the respective opposed flexible wall portions which is spaced from at least a seal-exposing edge of the sealed flange. a vacuum pump, means for communicating the enclosed spaces with the vacuum pump, and a mechanism for pulling at least one of the first and second vacuum enclosure means in a direction away from the other to stress the package in tension, wherein said means for detecting detects a local bulging of at least one of the opposed flexible wall portions of the package that is subjected to said lower pressure in said vacuum enclosure means.

11. The apparatus according to claim 10, wherein said means for detecting local bugling includes means for detecting the vacuum pressure in the enclosed space of at least one of the vacuum enclosure means.

12. The apparatus according to claim 10, wherein said means for detecting local bulging includes means for detecting a change in vacuum pressure over time in the enclosed space of at least one of the vacuum enclosure means.

13. The apparatus according claim 10, wherein at least one of the first and second vacuum enclosure means is a suction cup and said means for detecting detects bulging of the flexible wall portion within said suction cup.

14. The apparatus according to claim 10, wherein said means for detecting local bulging comprises a device for detecting the position of the at least one flexible wall portion that is subjected to said lower pressure in said vacuum enclosure means.

15. The apparatus according to claim 10, further comprising means for applying a pressure greater than atmospheric pressure to the outside of the package in the area of the seal-exposing edge of the sealed flange.

* * * * *